(12) United States Patent
Weinberger et al.

(10) Patent No.: US 12,442,724 B2
(45) Date of Patent: Oct. 14, 2025

(54) SOIL SAMPLER

(71) Applicant: Q.E.D. Environmental Systems, Inc., Dexter, MI (US)

(72) Inventors: Mark T. Weinberger, Mounds View, MN (US); David B. Kaminski, Clayton, CA (US); Daniel O. Hayes, Howell, MI (US); Hunter C. Anstadt, Ann Arbor, MI (US)

(73) Assignee: Q.E.D. Environmental Systems, Inc., Dexter, MI (US)

( * ) Notice: Subject to any disclaimer, the term of this patent is extended or adjusted under 35 U.S.C. 154(b) by 343 days.

(21) Appl. No.: 17/953,782

(22) Filed: Sep. 27, 2022

(65) Prior Publication Data

US 2023/0107158 A1  Apr. 6, 2023

Related U.S. Application Data

(60) Provisional application No. 63/251,561, filed on Oct. 1, 2021.

(51) Int. Cl.
*G01N 1/08* (2006.01)
(52) U.S. Cl.
CPC ...................................... *G01N 1/08* (2013.01)
(58) Field of Classification Search
CPC .......................................................... G01N 1/08
See application file for complete search history.

(56) References Cited

U.S. PATENT DOCUMENTS

| | | | |
|---|---|---|---|
| 3,326,049 A * | 6/1967 | Eley ........................ | E21B 25/00 73/429 |
| 3,557,616 A | 1/1971 | Landon et al. | |
| 3,841,144 A | 10/1974 | Baldwin | |
| 4,791,818 A | 12/1988 | Wilde | |
| 5,522,271 A * | 6/1996 | Turriff ..................... | G01N 1/08 73/864.45 |
| 6,253,625 B1 | 7/2001 | Samuelson et al. | |
| 6,679,125 B1 | 1/2004 | Brandt | |
| 7,308,832 B1 | 12/2007 | Ifft | |
| 7,921,726 B2 | 4/2011 | Ellegood | |
| 8,966,995 B2 | 3/2015 | Islam et al. | |
| 9,377,335 B2 | 6/2016 | Rindi | |
| 10,215,600 B2 | 2/2019 | Sheverev et al. | |
| 2018/0120865 A1 | 5/2018 | Nuryaningsih et al. | |
| 2020/0378872 A1* | 12/2020 | Terzic ..................... | G01N 33/24 |

FOREIGN PATENT DOCUMENTS

DE  2926811 A1  1/1981

OTHER PUBLICATIONS

"Collecting a Sample Using the Terra Core™ Sampling Kit", Jan. 15, 2016, YouTube.com, site visited May 30, 2025: https://www.youtube.com/watch?v=SPx3cn76TrA (Year: 2016).

* cited by examiner

*Primary Examiner* — Xin Y Zhong
(74) *Attorney, Agent, or Firm* — Kinney & Lange, P.A.

(57) ABSTRACT

A soil sampler includes a base and a plunger insertable into the base. The depth in which the plunger is inserted into the base determines the size of the sample collected by the soil sampler. The depth in which the plunger is inserted into the base can switch between a first size and a second size, allowing the user to collect different sample sizes using a single soil sampler. The soil sample that is collected can then be ejected from the soil sampler by shifting the plunger to an eject position relative to the base in which the plunger can shift further into the base to eject the soil sample.

19 Claims, 9 Drawing Sheets

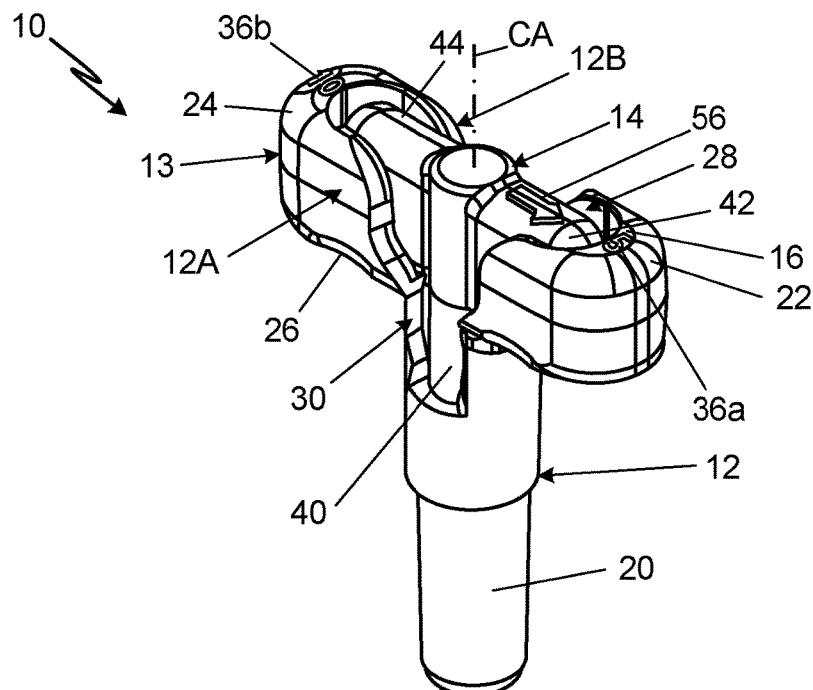
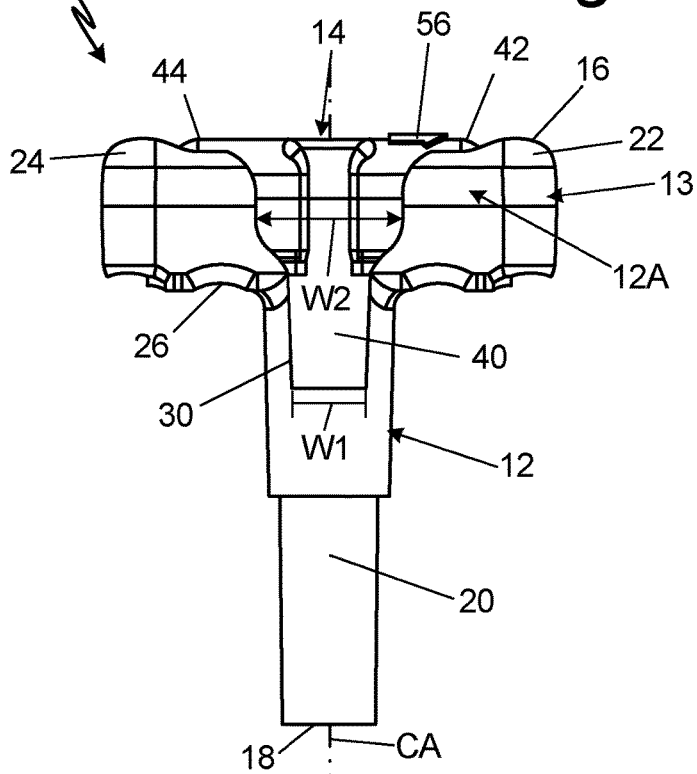
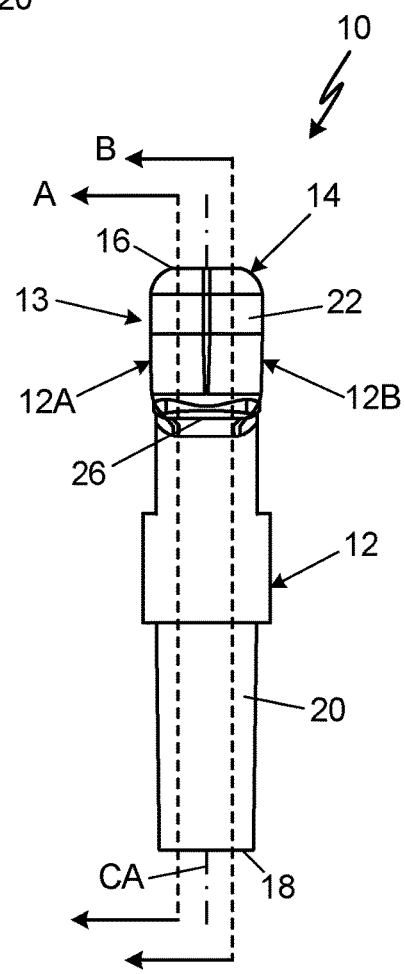
Fig. 3A
Fig. 3B
Fig. 3C

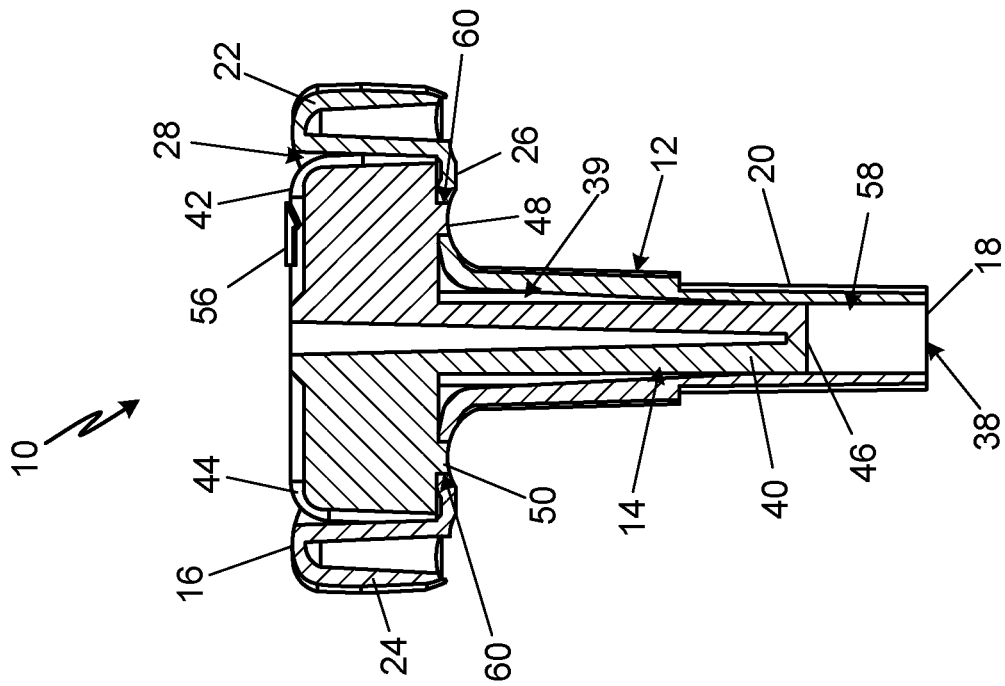
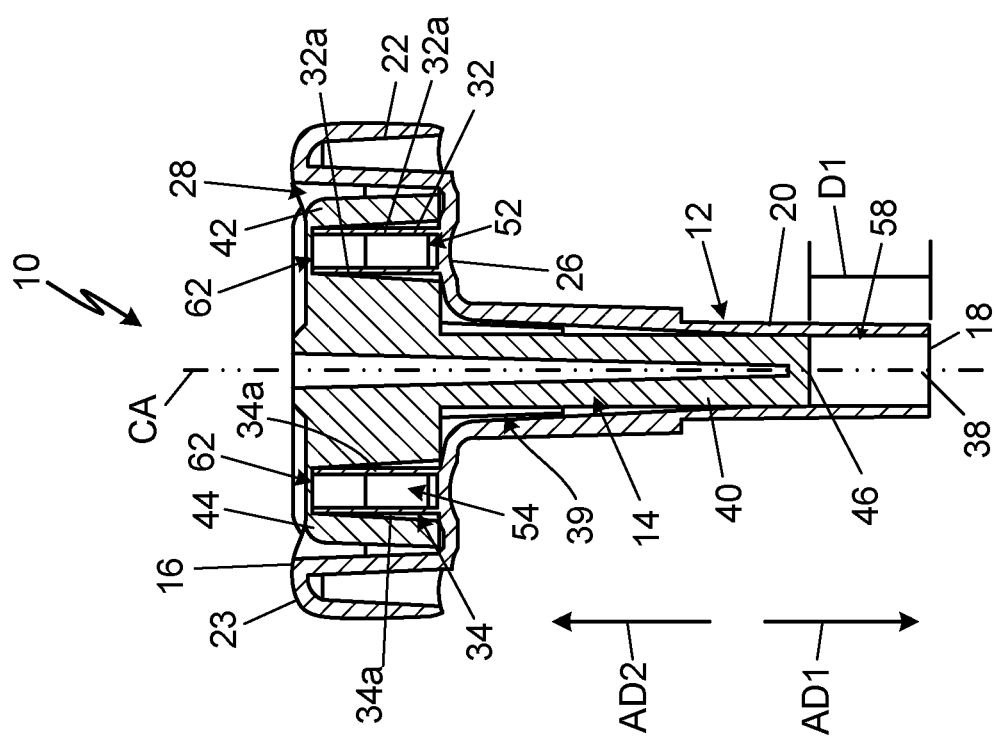

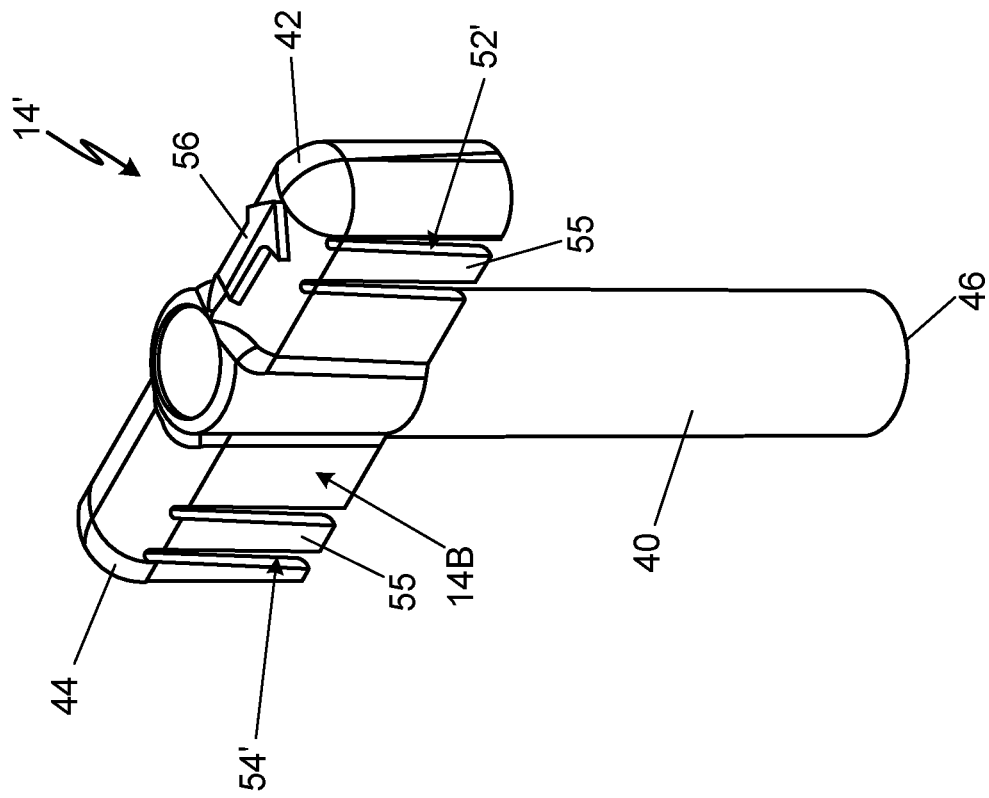
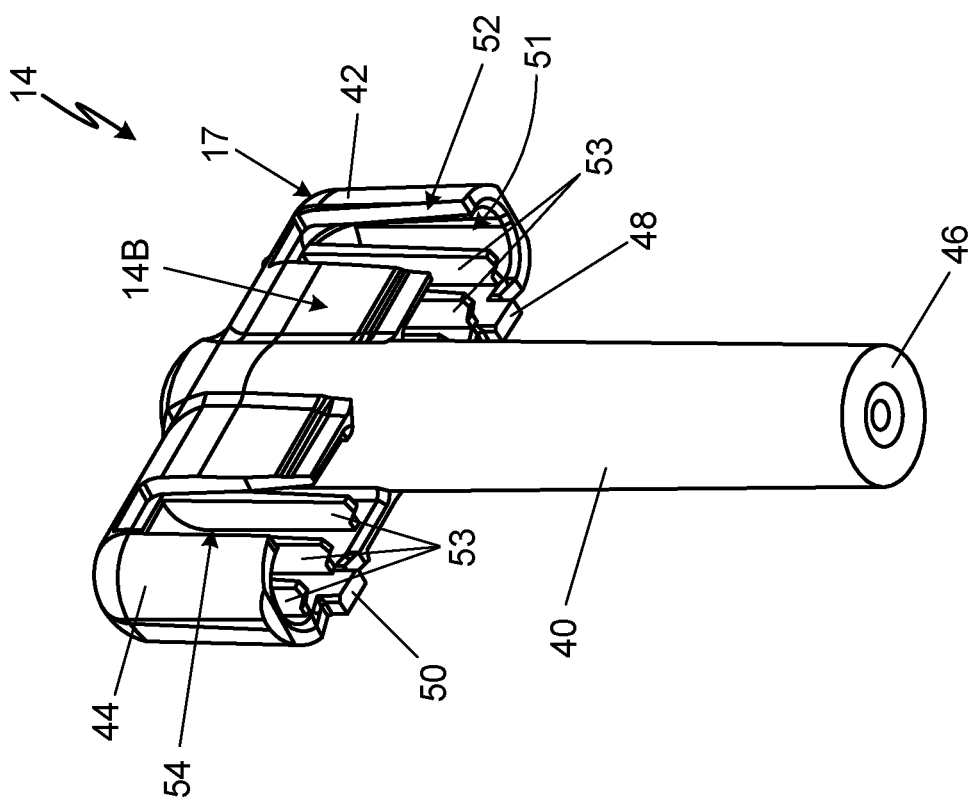

SOIL SAMPLER

CROSS-REFERENCE TO RELATED APPLICATION(S)

This application claims the benefit of U.S. Provisional Application Ser. No. 63/251,561, entitled "SOIL SAMPLER TOOL", filed Oct. 1, 2021, the disclosure of which is herein incorporated by reference.

BACKGROUND

The present disclosure relates generally to a soil sampler, and more particularly to a soil sampler configured to collect different sized samples.

Soil samplers are tools that are configured to collect a specific sample volume of soil for further analysis. In some examples, the soil sampler is used to collect a soil sample of a specific size and then the soil sample is transferred to a vial that is used to retain the soil sample for analysis at a later time. Some soil samplers utilize a syringe to eject the soil sample from the tool. The syringe-type tools are pressed into the ground and the soil displaces the syringe. Such a configuration can be difficult to use in wet conditions. Some previous soil samplers are configured to collect one specific sample size and a user must carry multiple soil samplers to collect different sample sizes of soil.

SUMMARY

According to an aspect of the disclosure, a soil sampler includes a base having a base body, a barrel extending along a collection axis from the base body to a distal end of the base, and a cavity extending into the base body through a proximal end of the base; and a plunger insertable into the base to define a volume of a collection cavity formed within the barrel. The plunger is mountable to the base in a first position corresponding to a first volume of the collection cavity, a second position corresponding to a second volume of the collection cavity different from the first volume, and a third position corresponding to a third volume of the collection cavity different from the second volume.

According to an additional or alternative aspect of the disclosure, a soil sampler for collecting sample volumes of soil, the soil sampler includes a base comprising a barrel elongate along a collection axis, a first base wing extending away from the barrel, a second base wing extending away from the barrel, a cavity extending into the first base wing and the second base wing, and a brace positioned within the cavity; and a plunger insertable into the base, the plunger comprising a first plunger wing, a second plunger wing, and an extension extending axially along a plunger axis from the first plunger wing and the second plunger wing. The extension is configured to be at least partially disposed within the barrel with the plunger in each of a first position associated with a first volume of a collection chamber within the barrel and a second position associated with a second volume of a collection chamber within the barrel. The brace interfaces with a lower surface of the plunger with the plunger disposed in each of the first position and the second position.

According to another additional or alternative aspect of the disclosure, a method of using a soil sampler to collect a soil sample includes aligning a plunger relative to a base in one of a first position and a second position, wherein an extension of the plunger extends into the base along a collection axis to define a collection cavity within the base, the extension at least partially disposed within the base with the plunger in both of the first position and the second position, the first position associated with a first volume of the collection cavity, and the second position associated with a second volume of the collection cavity, the second volume different from the first volume; pressing the base into soil to cause a sample of soil to enter into the collection cavity; pulling the plunger in a first axial direction along the collection axis and axially away from the base; rotating the plunger relative to the base to place the plunger in a third position relative to the base; and driving the plunger in a second axial direction opposite the first axial direction and into the base with the plunger disposed in the third position, the extension driving the sample of soil out of the collection cavity.

According to yet another additional or alternative aspect of the disclosure, a soil sampler includes a base having a barrel extending along an axis from a base body; and a plunger having a plunger body and an extension extending axially from the plunger body, the extension configured to extend into the barrel to define a collection cavity within the barrel. The plunger is mountable to the base in a plurality of orientations, the base interfacing with the plunger to limit a distance that the extension can extend into the barrel in each of the plurality of orientations. Each orientation of the plurality of orientations corresponds to a different volume of the collection cavity.

BRIEF DESCRIPTION OF THE DRAWINGS

FIG. 3A is an isometric view of the soil sampler in a first state.

FIG. 3B is a lateral side view of the soil sampler in the first state.

FIG. 3C is a longitudinal end view of the soil sampler in the first state.

FIG. 4A is a cross-sectional view of the soil sampler in the first state taken along line A-A in FIG. 3C.

FIG. 4B is a cross-sectional view of the soil sampler in the first state taken along line B-B in FIG. 3C.

FIG. 5 is an isometric view of an example of a plunger of a soil sampler.

FIG. 6 is an isometric view of another example of a plunger of a soil sampler.

DETAILED DESCRIPTION

Figure 1:
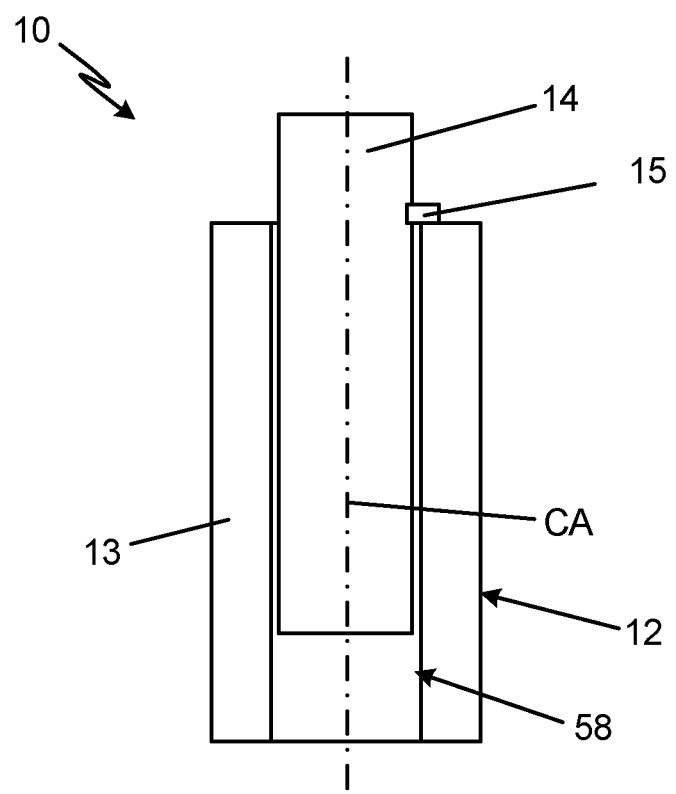
FIG. 1 is a schematic block diagram of a soil sampler.

FIG. 1A is a schematic block diagram showing soil sampler 10 including base 12, plunger 14, and volume adjuster 15. Soil sampler 10 is a tool that can be inserted into soil for taking specific volumes of soil for chemical analysis and environmental testing. Soil sampler 10 is configured to facilitate collection of multiple different soil sample sizes using a single tool, reducing part count and increasing the efficiency of the soil sample collection process. In some examples, soil sampler 10 can collect either or both of a 5 gram and a 10 gram sample size using a single soil sampler 10 by simply altering a position of plunger 14 relative to base 12. Soil sample size is based on weight rather than volume. Since weight can vary based on soil density and moisture content, the sample size collected is termed as a nominal gram weight, e.g., 5 gram, 10 gram or 25 gram nominal. Soil sampler 10 is configurable to collect different volumes of soil that correspond with the nominal sample weight.

Volume adjuster 15 limits a distance that plunger 14 can extend into base 12. Volume adjuster 15 thereby controls a volume of a soil collection cavity 58. Plunger 14 defines a volume of the collection cavity 58 formed within base 12. Soil is collected in collection cavity 58. Adjusting plunger 14 relative to base 14 can change the volume of collection cavity 58, facilitating collection of differently sized soil samples.

To change between the two different sample sizes, a user manipulates a position of plunger 14 relative to base 12 to change the positioning of volume adjuster 15 and thereby change a volume of collection cavity 58. For example, the user can shift plunger 14 axially (along collection axis CA) relative to base 12 and/or rotate plunger 14 relative to base 12, among other options. Volume adjuster 15 can be formed by portions of plunger 14 interfacing with portions of base 12. It is understood that volume adjuster 15 can be of any desired configuration suitable for limiting a distance that plunger 14 can extend into base 12. For example, volume adjuster 15 can be formed by a slot formed in one of plunger 14 and base 12 interfacing with a projection extending from the other one of plunger 14 and base 12. In one configuration of such an example, rotating plunger 14 can cause the projection to travel within the slot to displace plunger 14 axially relative to base 12. For example, the slot can extend circumferentially and axially relative to collection axis CA. In another configuration of such an example, interfacing the projection with a surface of the other one of plunger 14 and base 12 can define a first volume of collection cavity 58 and inserting the projection into the slot can define a second volume of collection cavity 58. In another example, volume adjuster 15 can be formed by a detent (e.g., spring-loaded among other options) in one of plunger 14 and base 12 interfacing with an opening in the other one of plunger 14 and base 12.

The distal end of soil sampler 10, through which soil samples enter into collection cavity 58, is sized to fit within various standard soil sample volatile organic analysis (VOA) vials, making is easier to collect and transfer the soil samples of various sizes into the vial for future chemical analysis and environmental testing. Soil sampler 10 is reconfigurable between multiple states to vary a volume of the collection cavity 58 that collects and retains the soil sample. Soil sampler 10 provides a single tool that can be reconfigured to collect different soil sample sizes, reducing the load on the user as the user is not required to carry multiple tools each configured to collect different sample sizes. Soil sampler 10 defines the sample volume and is configured to eject the soil sample for collection and analysis. Soil sampler 10 reduces the count of tools that a user needs to stock and simplifies inventory management because the user only need stock soil sampler 10, rather than multiple differently configured tools each associated with a single sample size.

Figure 2:
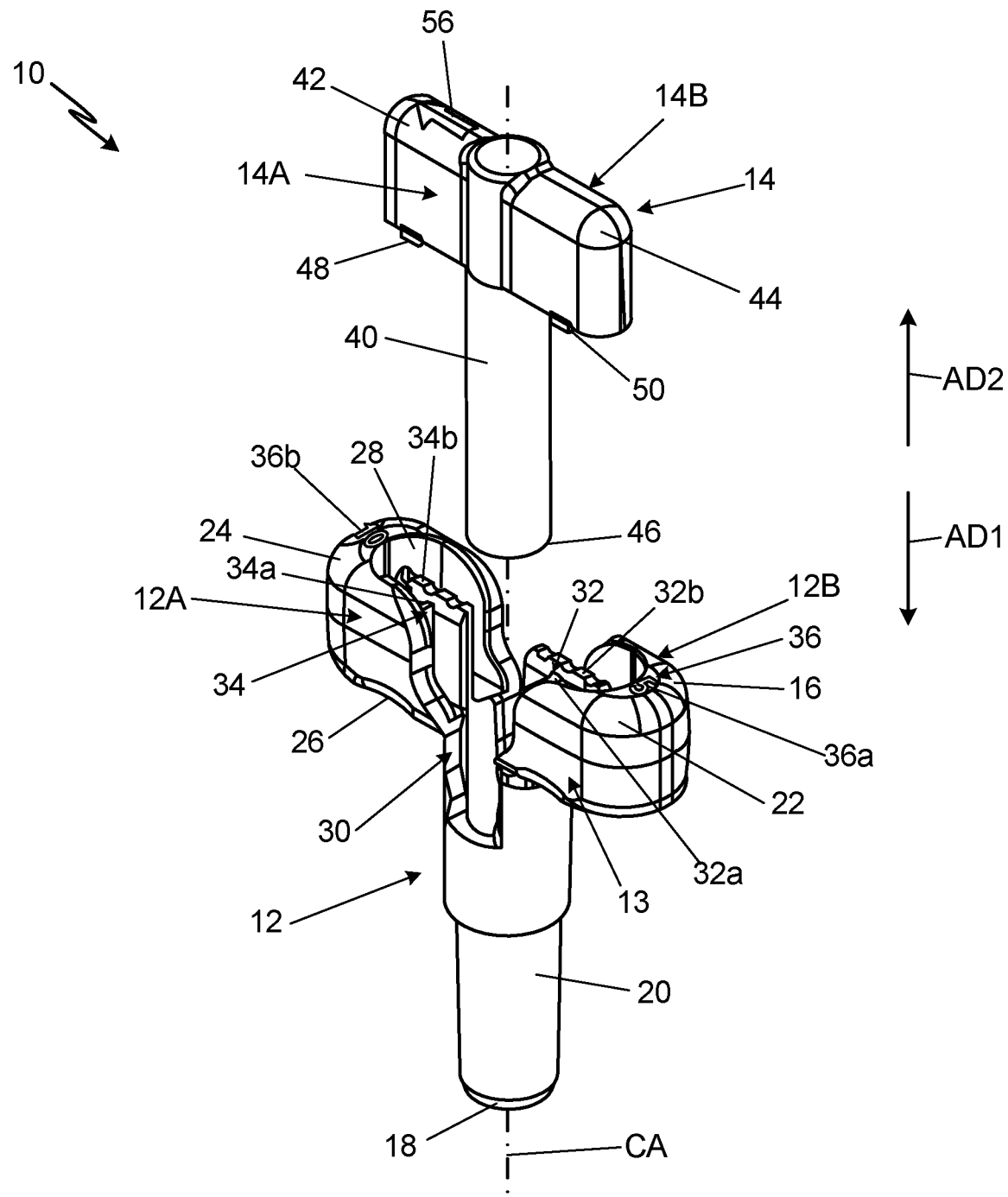
FIG. 2 is an exploded isometric view of an example soil sampler.

FIG. 2 is an exploded isometric view of an example soil sampler 10. Soil sampler 10 includes base 12 and plunger 14. Plunger 14 is configured to fit, translate, and rotate within base 12 to alter the sample size collected by soil sampler 10 and also to eject the soil sample from soil sampler 10. Base 12 includes base body 13, proximal end 16, distal end 18, and barrel 20. Base body 13 includes first base wing 22, second base wing 24, lower surface 26, cavity 28, slot 30, first brace 32, second brace 34, and indicators 36a, 36b (collectively herein "indicator 36" or "indicators 36"). Barrel 20 includes aperture 38 (FIG. 4A). Plunger 14 includes extension 40, first plunger wing 42, second plunger wing 44, plunger face 46, first stop 48, second stop 50, first receiver 52 (FIGS. 4A, 5), second receiver 54 (FIGS. 4A, 5), and indicator 56. As will be discussed, a collection cavity is defined within barrel 20 and by plunger face 46 of plunger 14. In some examples, as shown in FIG. 2, soil sampler 10 includes a rugged design with an integral T-shaped handle making soil sampler 10 easier to use than previous syringe type soil samplers, especially in hard packed soils. A standard syringe plunger must rise as the sample fills the chamber in the barrel, which prevents the user from putting force on the end of the sampler. Soil sampler 10 includes plunger 14 that is fixed in place during sample collection, leaving a void space 58 for the sample to fill inside the barrel 20. The user can exert force along the collection axis CA, rather than at locations offset therefrom. Aligning the driving force on collection axis CA makes it easier to drive barrel 20 into soil, such as hardpack soil that are difficult to sample with a syringe-type soil sampler. A user can hold the T-shaped handle in one hand, insert soil sampler 10 into the soil to collect a soil sample by driving soil sampler 10 along collection axis CA, and then withdraw soil sampler 10 from the soil with the collected soil sample of a particular volume held within soil sampler 10.

Proximal end 16 of base 12 is an end of soil sampler 10 positioned closest to a user's hand when a user is gripping and holding soil sampler 10. Proximal end 16 is the end of soil sampler 10 positioned closest to first base wing 22 and second base wing 24. Distal end 18 of base 12 is an end of soil sampler 10 positioned furthest from a user's hand when a user is gripping and holding soil sampler 10. Distal end 18 is the end of soil sampler 10 that is inserted into the soil to collect a soil sample of a specific size and/or volume. Distal end 18 is positioned at an opposite axial end of base 12 from as proximal end 16. Barrel 20 is a generally cylindrical feature of base 12 that extends from base body 13 to distal end 18 of base 12. In some examples, barrel 20 can include a tapered outer surface such that barrel 20 includes a tapered inner surface. In some examples, as shown, barrel 20 can include a step or ledge in an outer surface of barrel 20 positioned axially between distal end 18 and base body 13.

First base wing 22 and second base wing 24 each extend outwards from barrel 20 in opposite longitudinal directions. In the example shown, barrel 20, first base wing 22, and second base wing 24 form a generally T-shaped base 12. In the example shown, first base wing 22 and second base wing 24 are each positioned adjacent proximal end 16 of base 12. In some examples, first base wing 22 can be positioned 180-degrees from second base wing 24 relative to collection axis CA extending through a center of barrel 20 of base 12. In the example shown, first base wing 22 and second base wing 24 include rounded or smooth corners and edges to allow base 12 to be comfortably held within a user's hand. Further, in the example shown, both first base wing 22 and second base wing 24 include lower surface 26 positioned along the underside of each of first base wing 22 and second base wing 24. Lower surface 26 is oriented in first axial direction AD1, towards distal end 18. In some examples, lower surface 26 can include an at least partially curved surface. In certain examples, lower surface 26 can include a generally wavy surface. Lower surface 26 includes the partially curved/wavy surface to form grooves that conform to the shape of a user's fingers when a user is gripping and holding onto soil sampler 10, allowing soil sampler 10 to be comfortably held within a user's hand. Lower surface 26 is contoured to provide finger rest locations, providing an ergonomic grip surface for the user. As such, lower surface 26 can be considered to form a finger grip of base 12.

Cavity 28 is an empty space that is positioned and extends into base body 13 from proximal end 16. More specifically, cavity 28 is positioned between the longitudinally outer surfaces of first base wing 22 and second base wing 24 and cavity 28 is positioned between first lateral side 12A and second lateral side 12B of first base wing 22 and second base wing 24. In the example shown, cavity 28 extends into but not through first base wing 22 and second base wing 24. More specifically, cavity 28 extends from proximal end 16 of base 12 towards distal end 18 of base 12, but cavity 28 does not extend through lower surface 26 of first base wing 22 and second base wing 24. Cavity 28 is configured to provide an opening or space for plunger 14 to be insertable within. As such, cavity 28 generally has a complimentary mating shape as an outer shape of a portion of plunger 14, as discussed further below.

Slot 30 of base 12 is positioned adjacent and extends through both first lateral side 12A and second lateral side 12B of base 12. Slot 30 extends fully laterally though base 12, in the example shown. Further, slot 30 extends from proximal end 16 of base 12 a partial distance towards distal end 18 of base 12, such that slot 30 extends through a portion of each of base body 13 and barrel 20. Slot 30 extends axially beyond lower surface 26 towards distal end 18. Slot 30 includes a first section having a first width W1 and a second section having a second width W2, with the first width W1 being greater than the second width W2. The first section of slot 30 is positioned adjacent proximal end 16 of base 12 and extends towards distal end 18 of base 12. The second section of slot 30 is positioned adjacent an end of the first section of slot 30 and extends towards distal end 18 of base 12. The first and second sections of slot 30 allow a user to easily grab onto plunger 14 to remove plunger 14 from base 12. More specifically, the first section of slot 30 includes a greater width than the second section of slot 30 to provide enough space for a user to easily grab onto plunger 14 with their thumb and fingers from opposite lateral sides of base 12 to remove plunger 14 from base 12. Slot 30 further facilitates plunger 14 shifting into base 12 during an ejection procedure during which a soil sample is ejected from base 12 by plunger 14.

First brace 32 is positioned within a portion of cavity 28 formed within first base wing 22 and first brace 32 extends from first lateral side 12A of base 12 towards second lateral side 12B of base 12. Second brace 34 is positioned within a portion of cavity 28 formed within second base wing 24 and second brace 34 extends from first lateral side 12A of base 12 towards second lateral side 12B of base 12. First brace 32 and second brace 34 are projections that are configured to interface with plunger 14 to limit an axial distance that plunger 14 can extend into base 12. Each of first brace 32 and second brace 34 extend from an inner side of the wall of base 12 that forms lower surface 26 towards proximal end 16. First brace 32 and second brace 34 project into cavity 28. First brace 32 and second brace 34 are each protrusions positioned on only one longitudinal half of base 12 that are configured to either extend within features of plunger 14 or abut features of plunger 14, depending on the orientation of plunger 14 relative to base 12, discussed further below. First brace 32 and second brace 34 are disposed on opposite longitudinal sides of slot 30. In the example shown, neither first brace 32 nor second brace 34 bridges longitudinally across the slot 30.

First brace 32 includes lateral ribs 32a and longitudinal rib 32b. Lateral ribs 32a extend laterally into cavity 28 from lateral side 12A. Longitudinal rib 32b is disposed within the portion of cavity formed within first base wing 22. Longitudinal rig 32b is longitudinally elongate. Longitudinal rib 32b does not directly interface with the lateral or longitudinal walls of base 12 that define cavity 28. Longitudinal rib 32b is connected to lateral ribs 32a. In the example shown, first brace 32 includes a pair of lateral ribs 32a that extend to connect with longitudinal rib 32b. An aperture 62 is defined between the lateral ribs 32a. In the example shown, the aperture 62 is defined by each of lateral ribs 32a and longitudinal rib 32b. Aperture 62 is configured to receive a portion of plunger 14.

Second brace 34 includes lateral ribs 34a and longitudinal rib 34b. Lateral ribs 34a extend laterally into cavity 28 from lateral side 12A. Longitudinal rib 34b is disposed within the portion of cavity formed within second base wing 24. Longitudinal rig 34b is longitudinally elongate. Longitudinal rib 34b does not directly interface with the lateral or longitudinal walls of base 12 that define cavity 28. Longitudinal rib 34b is connected to lateral ribs 34a. In the example shown, second brace 34 includes a pair of lateral ribs 34a that extend to connect with longitudinal rib 34b. An aperture 62 is defined between the lateral ribs 34a. In the example shown, the aperture 62 is defined by each of lateral ribs 34a and longitudinal rib 34b. Aperture 62 is configured to receive a portion of plunger 14.

Indicators 36 are formed on base 12. In the example shown, indicators 36 are formed on first base wing 22 and second base wing 24, though it is understood that not all examples are so limited. Indicators 36 are disposed on proximal end 16 of base 12. Indicators 36 can be letters, numbers, or other symbols that are utilized to identify the configuration of soil sampler 10 and specifically the sample size that soil sampler 10 is configured to collect. More specifically, indicators 36 are utilized to identify the volume of the soil sample size to be collected. In some examples, as shown, first base wing 22 can include a first numeral ("5" in the example shown) extending from or into first base wing 22, and second base wing 24 can include a second numeral ("10" in the example shown) extending from or into second base wing 24. The numerals indicate which orientation soil sampler 10 is in, allowing the user to easily identify the volume of soil that soil sampler 10 is in a configuration to collect. As such, a user can identify the size of the soil sample that soil sampler 10 is configured to collect based on the orientation of plunger 14 relative to base 12 as indicated by indicators 36 and indicator 56.

Plunger 14 includes extension 40, first plunger wing 42, second plunger wing 44, plunger face 46, first stop 48, second stop 50, and indicator 56. Extension 40 is a generally cylindrical feature of plunger 14 that includes plunger face 46 positioned at a distal free end of extension 40. Plunger face 46 is a solid surface disposed at the distal free end of extension 40 utilized to define a soil sample size, discussed further below. In some examples, extension 40 can include a tapered outer surface such that extension 40 includes a generally tapered cylindrical shape, with the free end of extension 40 having the smallest outer diameter and the outer diameter of extension 40 gradually increasing as extension 40 extends towards first plunger wing 42 and second plunger wing 44. Extension 40 extends from plunger face 46 towards and terminates at first plunger wing 42 and second plunger wing 44.

First plunger wing 42 and second plunger wing 44 each extend outwards from extension 40. In the example shown, first plunger wing 42 extends in an opposite direction from second plunger wing 44, though it is understood that not all examples are so limited. In the example shown, extension 40, first plunger wing 42 and second plunger wing 44 form a generally T-shaped plunger 14. Further, first plunger wing 42 and second plunger wing 44 are each positioned at an upper end of plunger 14. In some examples, first plunger wing 42 can be positioned 180-degrees from second plunger wing 44 relative to collection axis CA extending through a center of extension 40 of plunger 14. Although soil sampler 10 is described as having a collection axis CA, it is to be understood that base 12 extends along a base axis BA plunger 14 extends along a plunger axis PA. The base axis BA and plunger axis PA are disposed coaxially on the collection axis CA with plunger 14 mounted to base 12.

In the example shown, first plunger wing 42 and second plunger wing 44 include rounded or smooth corners and edges to allow plunger 14 to be comfortably held within a user's hand. Plunger 14 is configured to be insertable into base 12 to define the sample size of the soil sample collected by soil sampler 10. More specifically, extension 40 is configured to extend within barrel 20 coaxially with barrel 20 to define the soil sample size. First plunger wing 42 and second plunger wing 44 can extend at least partially into cavity 28 with plunger 14 mounted to base 12.

First stop 48 extends downward from a lower surface of first plunger wing 42 in a same axial direction as extension 40. Second stop 50 extends downward from a lower surface of second plunger wing 44 in a same axial direction as extension 40. First stop 48, second stop 50, and extension 40 all extend in first axial direction AD1.

First stop 48 and second stop 50 are disposed on first lateral side 14A of plunger 14. First stop 48 and second stop 50 are each projections positioned on only one lateral side of plunger 14, in the example shown. First stop 48 and second stop 50 are configured to either extend into or interface with a portion of base 12, depending on the orientation of plunger 14 relative to base 12.

Indicator 56 of plunger 14 is positioned on first plunger wing 42 on the uppermost surface of plunger 14, in the example shown. Indicator 56 can be letters, numbers, or other symbols that are utilized to identify the configuration of soil sampler 10 and specifically the sample size that soil sampler 10 is oriented to collect. More specifically, indicator 56 is utilized to identify the volume of the soil sample size to be collected. As shown, indicator 56 is formed as an arrow symbol extending from or into plunger 14, though it is understood that not all examples are so limited. Indicator 56 is utilized to indicate the orientation of plunger 14 relative to base 12, allowing the user to easily identify a first sample size (with indicator 56 oriented towards a first indicator 36 of base 12) and a second sample size (with indicator 56 oriented towards a second indicator 36 of base 12). In the example show, the indicator 56 is disposed on first plunger wing 42. As such, a user can identify the size of the sample that soil sampler 10 is configured to collect based on the configuration of indicator 56 relative to indicators 36.

Soil sampler 10 is configured to collect multiple different soil sample sizes and then eject the soil sample, depending on the orientation of plunger 14 relative to base 12. Soil sampler 10 can be considered to be reconfigurable between a first position associated with a first soil volume, a second position associated with a second soil volume, and a third position associated with ejecting the soil sample from base 12. Soil sampler 10 is reconfigurable to collect the different soil sample sizes within soil sampler 10 and then eject the soil sample from soil sampler 10. More specifically, plunger 14 can be described as being oriented in a first position (FIGS. 3A-3C), a second position (FIGS. 7A-7C), and a third position (9A-9B) relative to base 12 to change a volume of collection cavity 58.

FIG. 3A is an isometric view of soil sampler 10 in a first collection state. FIG. 3B is a lateral end view of soil sampler 10 in the first collection state. FIG. 3C is a longitudinal end view of soil sampler 10 in the first collection state. FIG. 4A is a cross-sectional view of soil sampler 10 in the first collection state taken along line A-A in FIG. 3C. FIG. 4B is a cross-sectional view of soil sampler 10 in the first collection state taken along line B-B in FIG. 3C. FIG. 5 is an isometric view of plunger 14. FIGS. 3A-5 will be discussed together.

As shown best in FIGS. 3A-3C, with plunger 14 oriented in the first position relative to base 12, plunger 14 is positioned within base 12 such that a top surface of plunger 14 is generally flush or parallel with proximal end 16 of base 12. More specifically, first plunger wing 42 and second plunger wing 44 of plunger 14 are positioned within cavity 28 of base 12, and extension 40 of plunger 14 is positioned and extends within barrel 20 of base 12. Further, when plunger 14 is oriented in the first position relative to base 12, first plunger wing 42 is aligned with and disposed at least partially within first base wing 22 of base 12, and second plunger wing 44 is aligned with and disposed at least partially within second base wing 24 of base 12. In the example shown, plunger 14 being oriented in the first position corresponds to a smaller sample size relative to the sample size associated with the second position.

One way that a user can identify that soil sampler 10 is oriented in the first collection state and configured to collect a smaller sample size is by verifying that a top surface of plunger 14 is generally flush or parallel with proximal end 16 of base 12. This indicates that plunger 14 is positioned further within base 12 and the sample size will be of a smaller volume or weight. Another way that a user can identify that soil sampler 10 is configured to collect a smaller sample size is by viewing the relative positions of indicators 36 of base 12 and indicator 56 of plunger 14. More specifically, in the example shown indicator 56 (e.g., an arrow symbol) of plunger 14 is positioned adjacent to and points at indicator 36a (i.e., the numeral "5") of base 12 to indicate to the user that soil sampler 10 is positioned to collect the smaller volume sample size.

Referring to FIGS. 4A-4B, when plunger 14 is oriented in the first position relative to base 12, plunger 14 is inserted into base 12 such that extension 40 of plunger 14 extends within barrel 20 of base 12. This positions plunger face 46 of plunger 14 a first axial distance D1 away from distal end 18 of base 12. Collection cavity 58 is defined by the relative positioning of plunger face 46 and distal end 18 of base 12. As such, plunger 14 being oriented in the first position causes collection cavity 58 to have a first volume corresponding to a first soil sample size. Reorienting plunger 14 in a different position relative to base 12 changes the volume of collection cavity 58, as discussed further below. As such, the volume of collection cavity 58 depends on the positioning of plunger 14 relative to base 12, and therefore the distance between plunger face 46 and distal end 18.

Aperture 38 is an opening in distal end 18 through which soil samples can enter into and be ejected from barrel 20. Void 39 extends through base 12 between distal end 18 and proximal end 16. Void 39 is partially formed by cavity 28 and slot 30 and extends axially within barrel 20 to distal end 18. Void 39 providing a space for features of plunger 14 to extend within and a space for a soil sample to be collected. In some examples, void 39 can be tapered such that the portion of void 39 adjacent distal end 18 of base has the smallest diameter of void 39, and the diameter of void 39 gradually increases as void 39 extends towards proximal end 16. As such, barrel 20 and void 39 can together form a generally tapered hollow cylinder extending from distal end 18 towards proximal end 16, with the generally tapered hollow cylinder terminating at lower surface 26 of first base wing 22 and second base wing 24. Barrel 20 and void 39 can include the generally tapered shape to facilitate ease of manufacturing, especially for an injection molding process. In some examples, each of plunger 14 and base 12 can be separately manufactured using an injection molding process and then the components can be assembled together to form soil sampler 10. Barrel 20 is hollow to allow plunger 14 to shift axially within barrel 20 and relative to base 12. More specifically, extension 40 extends into the hollow barrel 20 to define the volume of the collection cavity 58. Aperture 38 is formed at distal end 18 and is an opening through which soil samples can enter into barrel 20 and through which soil samples can be ejected from barrel 20.

As shown in FIG. 4A, when plunger 14 is oriented in the first position relative to base 12, first brace 32 and second brace 34 of base 12 are positioned within first receiver 52 and second receiver 54 (shown best in FIG. 5), respectively, of plunger 14. More specifically, first brace 32 of base 12 extends into first receiver 52 of plunger 14, and first brace 32 abuts an upper surface of first receiver 52 to prevent plunger 14 from extending further into base 12. Likewise, second brace 34 of base 12 extends into second receiver 54 of plunger 14, and second brace 34 abuts an upper surface of second receiver 54 to prevent plunger 14 from extending further into base 12. In some examples, first brace 32 and second brace 34 can be sized to interface with first receiver 52 and second receiver 54, respectively, by an interference fit (a.k.a. a friction fit), to secure plunger 14 to base 12 when plunger 14 is in the first position. More specifically, the lateral ribs 32a of first brace 32 can extend into first receiver 52 and engage with the walls on either longitudinal side of first receiver 52 that define first receiver 52 to form the interference fit. Similarly, the lateral ribs 34a of second brace 34 can extend into second receiver 54 and engage with the walls on either longitudinal side of second receiver 54 that define second receiver 54 to form the interference fit.

As shown in FIG. 4B, when plunger 14 is oriented in the first position relative to base 12, first stop 48 and second stop 50 are inserted into apertures 60 extending through lower surface 26 of base 12. In some examples, first stop 48 and second stop 50 can be sized to interface with apertures 60 by an interference fit (a.k.a. a friction fit), which secures plunger 14 to base 12 when plunger 14 is in the first position. Plunger 14 being oriented in the first position relative to base 12 results in soil sampler 10 being configured to collect a soil sample of a first size. A user can insert distal end 18 of base 12 into the soil which causes soil to enter into and collect within collection cavity 58. The user can then remove soil sampler 10 from the soil and the collected soil sample will remain within collection cavity 58 until the user forces the soil sample out from soil sampler 10 for chemical analysis, as discussed below.

As best seen in FIG. 5, first receiver 52 extends from a lower surface of first plunger wing 42 and in second axial direction AD2 into first plunger wing 42. Second receiver 54 extends from a lower surface of second plunger wing 44 and in second axial direction AD2 into second plunger wing 44. Each of first receiver 52 and second receiver 54 are positioned on second side 14B of plunger 14. More specifically, first receiver 52 on second side 14B is positioned opposite first stop 48 on first side 14A of first plunger wing 42, and second receiver 54 on second side 14B is positioned opposite second stop 50 on first side 14A of second plunger wing 44. First receiver 52 and second receiver 54 are each cutouts positioned to accept features of base 12 when plunger 14 is positioned in a specific orientation relative to base 12. In the example shown in FIG. 5, first receiver 52 and second receiver 54 are generally rectangular cutouts within first plunger wing 42 and second plunger wing 44, respectively.

Plunger 14 further includes plunger ribs 53 that are disposed within a plunger cavity 51 formed within the body 17 of plunger 14 that is formed by first plunger wing 42 and second plunger wing 44. Barrel 40 extends axially from body 17. Plunger cavity 51 is formed as two distinct cavities in the example shown, a first cavity in first plunger wing 42 and a second cavity in second plunger wing 44. Plunger ribs 53 are formed in plunger cavity 51 and project laterally into plunger cavity 51 from first lateral side 14A of plunger 14. In the example shown, plunger ribs 53 extend from a base of plunger cavity 51, oriented in second axial direction AD2. Plunger ribs 53 extend only partially across the lateral width of plunger cavity 51.

Plunger cavity 51 is open in first axial direction AD1. Plunger cavity 51 is formed such that first brace 32 and second brace 34 can enter into plunger cavity 51 with soil sampler 10 in the first collection state. First brace 52 and second brace 54 entering into plunger cavity 51 facilitates plunger body 17 recessing within cavity 28, which allows the user to exert force directly on base body 13 along collection axis CA.

Plunger ribs 53 are configured to engage with first brace 32 and second brace 34 with soil sampler 10 in the second collection state. Specifically, plunger ribs 53 engage with longitudinal ribs 32b, 34b. Plunger ribs 53 engaging with first brace 32 and second brace 34 prevents plunger 14 from shifting further into cavity 28, maintaining plunger 14 in the elevated position relative to base 12 to provide the larger volume collection cavity 58. Plunger ribs 53 engaging with first brace 32 and second brace 34 facilitates force transmission from plunger 14 to brace 12 as the user exerts force along collection axis CA to drive the barrel 20 into the soil. The user can push directly on plunger 12 to drive barrel 20 into the soil. Plunger ribs 53 exert force on longitudinal ribs 32b, 34b, which spreads the force longitudinally along base 12, providing for even force application that assists in collecting a uniform sample.

FIG. 6 is an isometric view of plunger 14'. Plunger 14' is substantially similar to plunger 14 (best seen in FIG. 5), except that receivers 54' and 52' each include a tab 55 that projects in first axial direction AD1 from a top surface of plunger 14'. The tab 55 is cantilevered. The tab 55 is disposed longitudinally between axially elongate slots. The tab 55 is configured to extend into the chamber defined between the lateral ribs 32a or 34a while the lateral ribs 32a or 34a extend within the slots on either longitudinal side of the tab 55, when the soil sampler 10 is placed in the second collection state.

Figure 7A:
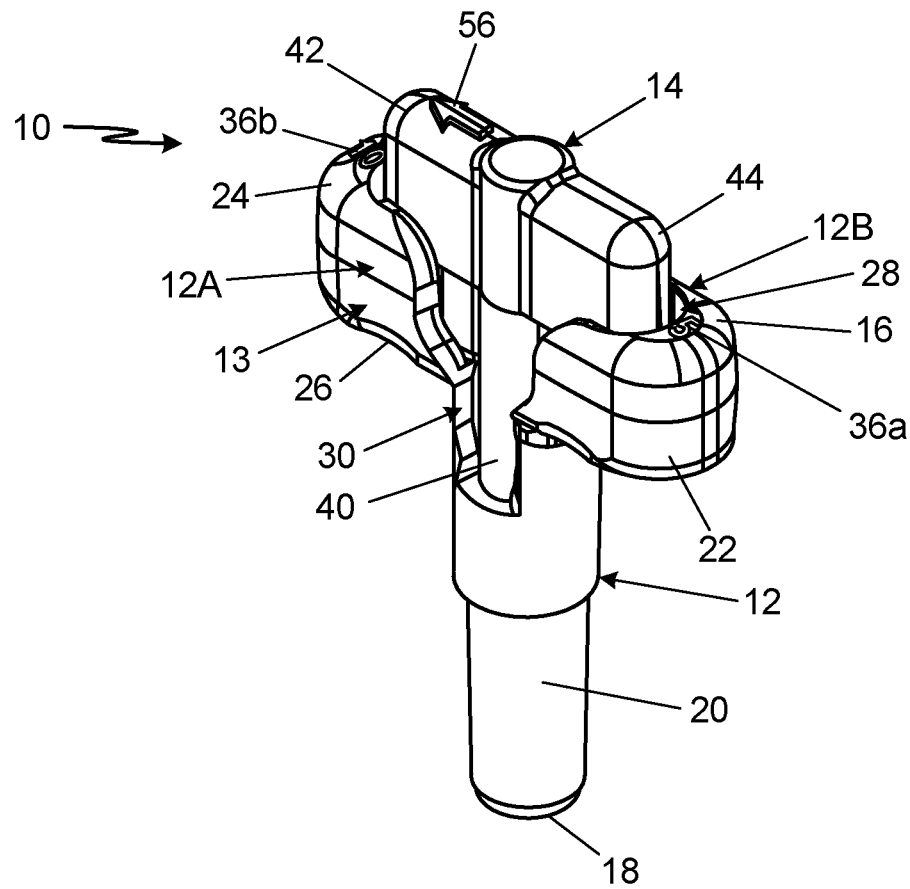
FIG. 7A is an isometric view of the soil sampler in a second state.
Figure 7C:
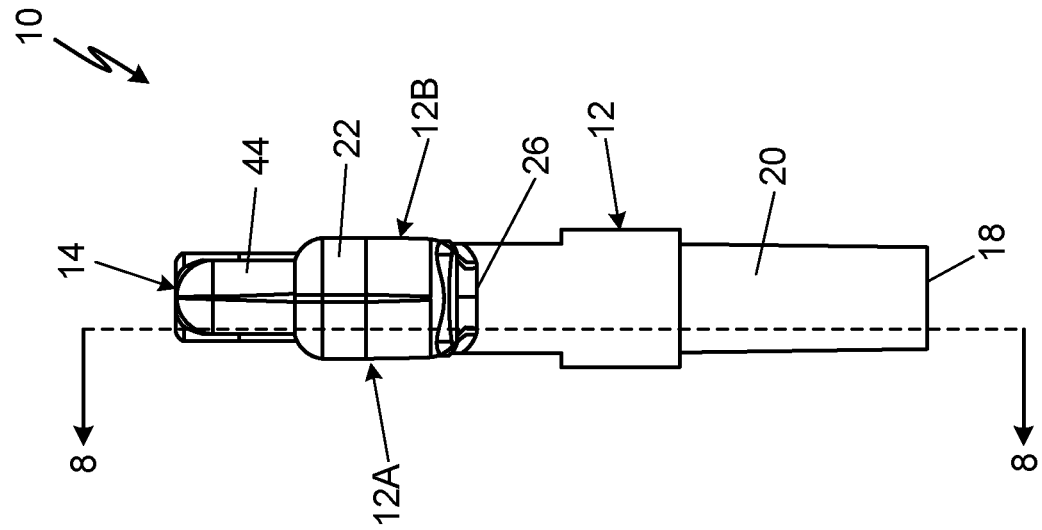
FIG. 7C is a longitudinal end view of the soil sampler in the second state.
Figure 7B:
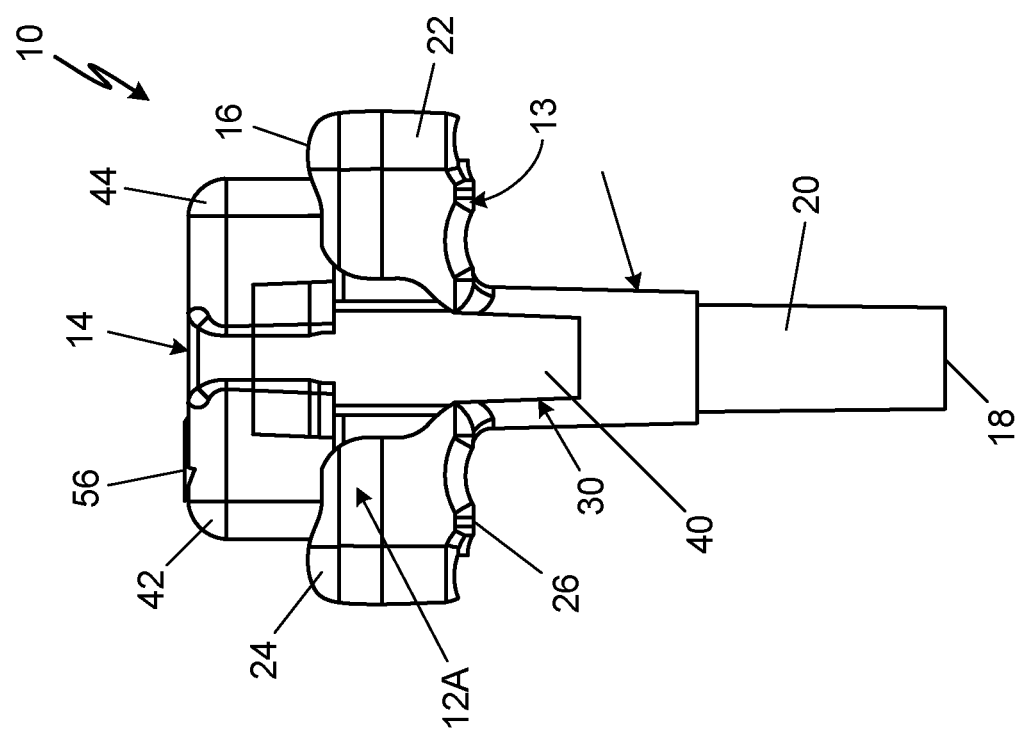
FIG. 7B is a lateral side view of the soil sampler in the second state.
Figure 8:
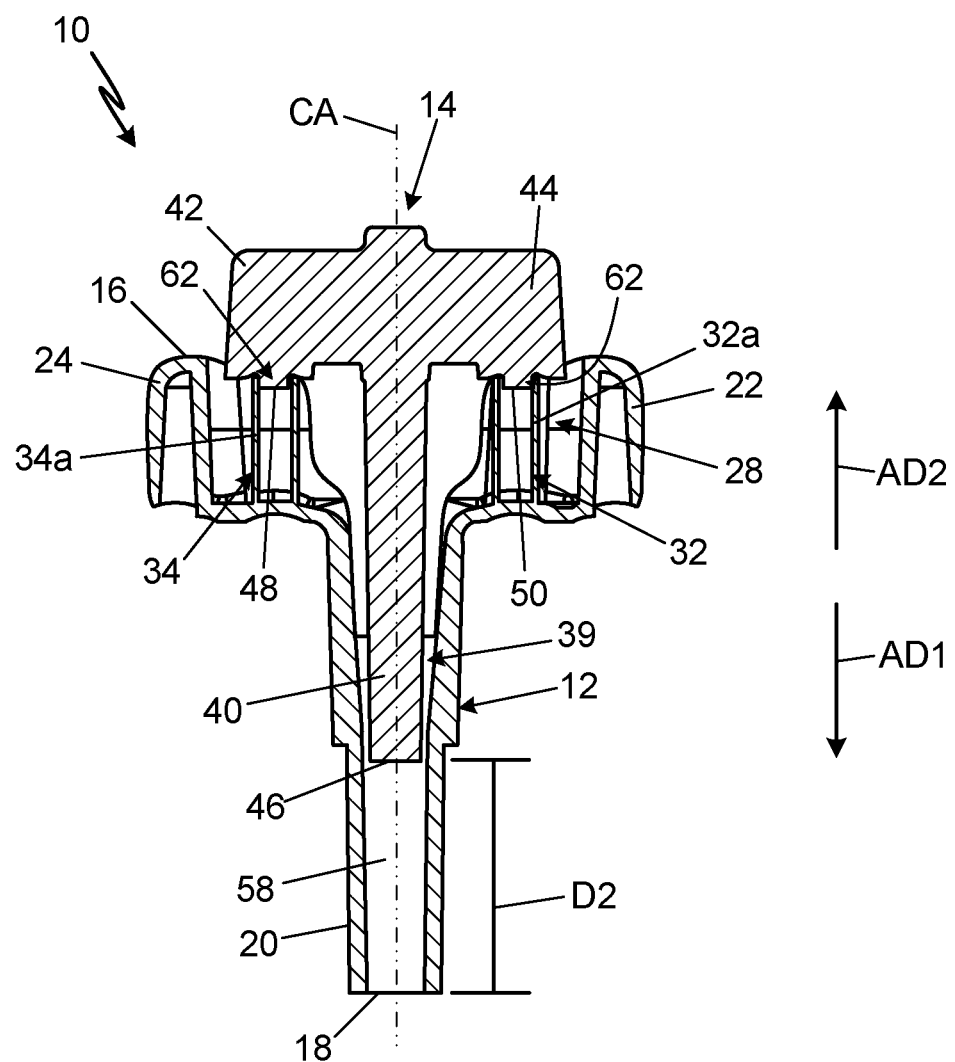
FIG. 8 is a cross-sectional view of the soil sampler in the second state taken along line 8-8 in FIG. 7C.

FIG. 7A is an isometric view of soil sampler 10 in a second collection state. FIG. 7B is a lateral side view of soil sampler 10 in the second collection state. FIG. 7C is a longitudinal end view of soil sampler 10 in the second collection state. FIG. 8 is a cross-sectional view of soil sampler 10 in the second collection state taken along line 8-8 of FIG. 7C. FIGS. 7A-8 will be discussed together. To switch soil sampler 10 from the first collection state (FIGS. 3A-4B) to the second collection state, a user can grasp plunger 14, such as through slot 30 of base 12, and then the user lifts and pulls plunger 14 in second axial direction AD2 along collection axis CA outwards from base 12 in a direction away from distal end 18 of base 12. The user then rotates plunger 14 on collection axis CA relative to base 12. In the example shown, the user rotates plunger 14 180-degrees on collection axis CA between the first and second positions. The user then shifts plunger 14 along collection axis CA in first axial direction AD1 and towards distal end 18 of base 12 such that extension 40 extends into void 39 within base 12, and specifically such that extension 40 extends within barrel 20. Plunger 14 is inserted into base 12 until first stop 48 and second stop 50 of plunger 14 engage second brace 34 and first brace 32, respectively, of base 12.

As shown best in FIGS. 7A-7C, when plunger 14 is oriented in the second position relative to base 12, plunger 14 is partially disposed within base 12 such that a top surface of plunger 14 extends axially outwards from proximal end 16 of base 12. Specifically, plunger 14 projects axially outward from base 12 in second axial direction AD2. First plunger wing 42 and second plunger wing 44 of plunger 14 extend at least partially outwards from cavity 28 of base 12, and extension 40 of plunger 14 extends at least partially within barrel 20 of base 12. Further, when plunger 14 is oriented in the second position relative to base 12, first plunger wing 42 of plunger 14 is aligned with second base wing 24 of base 12, and second plunger wing 44 of plunger 14 is aligned with first base wing 22 of base 12. In the example shown, plunger 14 being oriented in the second position corresponds to a larger sample size relative to soil sampler 10 being in the first collection state. In some examples, the larger sample size can be a 10 gram soil sample size. In other examples, the larger sample size can be more or less than a 10 gram soil sample size.

One way that a user can identify that soil sampler 10 is oriented in the second position and configured to collect a larger sample size is by verifying that a top surface of plunger 14 extends outwards from proximal end 16 of base 12, such that the top surface of plunger 14 is not flush or parallel with proximal end 16 of base 12. This indicates that plunger 14 is positioned at least partially outside of base 12 and the sample size will be of a large volume or weight. Another way that a user can identify that soil sampler 10 is configured to collect a larger sample size is by viewing the relative positions of indicators 36 of base 12 and indicator 56 of plunger 14. More specifically, in the example shown indicator 56 (i.e., an arrow symbol) of plunger 14 is positioned adjacent to and points towards indicator 36b (i.e., the numeral "10") to indicate to the user that soil sampler 10 is positioned to collect a larger volume or weight sample size.

Referring to FIG. 8, when plunger 14 is oriented in the second position relative to base 12, plunger 14 is inserted into base 12 such that extension 40 of plunger 14 extends within barrel 20 of base 12. This positions plunger face 46 of plunger 14 a second axial distance D2 from distal end 18 of base 12. Collection cavity 58 is defined by the relative positioning of plunger face 46 and distal end 18 of base 12. The second axial distance D2 is greater than the first axial distance D1. As such, plunger 14 being oriented in the second position causes collection cavity 58 to have a second volume larger than the collection volume with plunger 14 in the first position. In the example shown, plunger 14 being oriented in the second position causes the distance between plunger face 46 and distal end 18 to increase, compared to plunger 14 being oriented in the first position, which in turn causes the volume of collection cavity 58 to increase. Therefore, plunger 14 being in the second position results in collection cavity 58 having a second volume which is greater than the first volume when plunger 14 is oriented in the first position.

As shown in FIG. 8, when plunger 14 is oriented in the second position relative to base 12, first stop 48 and second stop 50 of plunger 14 abut second brace 34 and first brace 32, respectively, of base 12. With plunger 14 oriented in the second position relative to base 12, first stop 48 of plunger 14 abuts second brace 34 of base 12, and second stop 50 of plunger 14 abuts first brace 32 of base 12. As shown, first stop 48 and second stop 50 can be inserted into apertures 62 within second brace 34 and first brace 32, respectively, of base 12. In some examples, first stop 48 and second stop 50 can be sized to interface with apertures 62 within second brace 34 and first brace 32, respectively, by an interference fit (a.k.a. a friction fit), which secures plunger 14 to base 12 when plunger 14 is in the second position.

First brace 32 and second brace 34 interface with plunger ribs 53 to support plunger 14 in the second position in which plunger body 17 projects axially outward from base 12. Plunger 14 being oriented in the second position relative to base 12 results in soil sampler 10 being configured to collect a soil sample of a second size. As such, a user can insert distal end 18 of base 12 into the soil which causes a second soil sample size to collect within collection cavity 58. The user can then remove soil sampler 10 from the soil and the collected soil sample will remain within collection cavity 58 until the user forces the soil sample out from soil sampler 10 for chemical analysis, as discussed below.

Figure 9B:
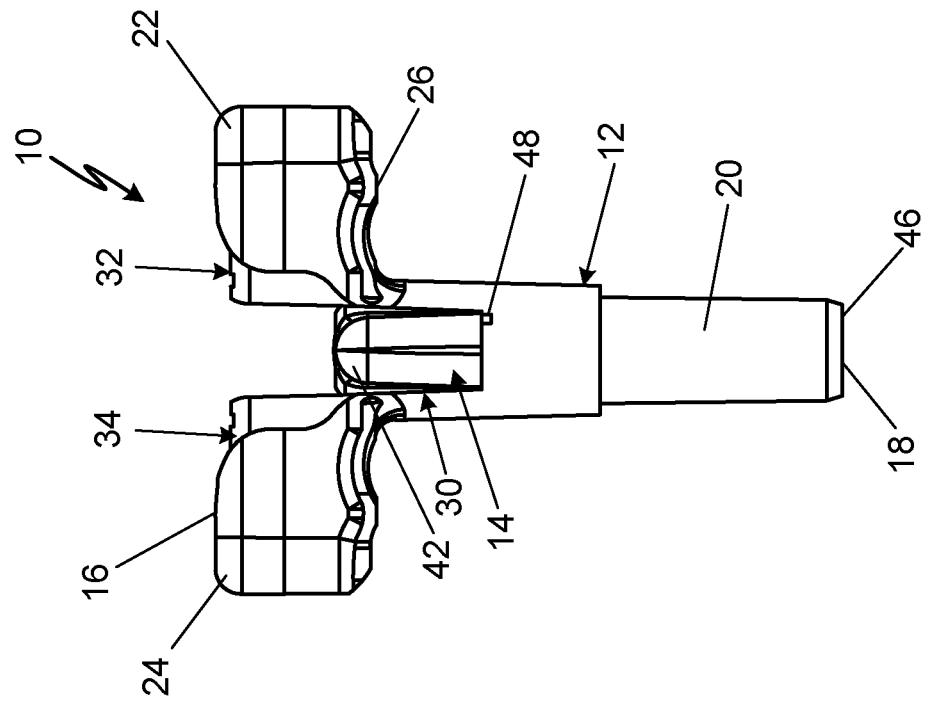
FIG. 9B is a lateral end view of the soil sampler in the third state.
Figure 9A:
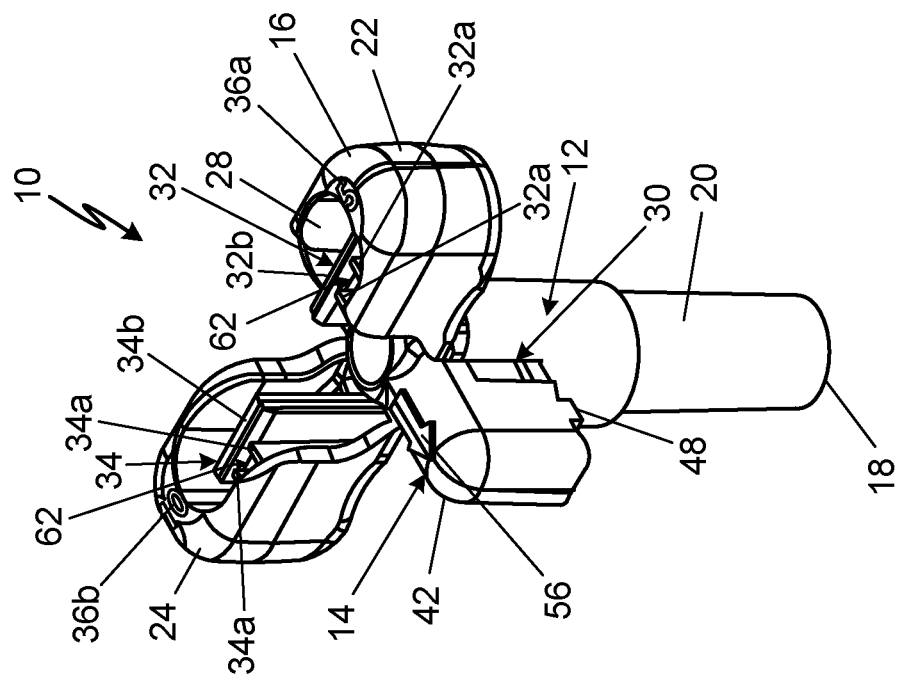
FIG. 9A is an isometric view of the soil sampler in a third state.

FIG. 9A is an isometric view of soil sampler 10 in a third state. FIG. 9B is a lateral end view of soil sampler 10 in the eject state. FIGS. 9A-9B will be discussed together. Plunger 14 is disposed in a third orientation relative to base 12 that is different from the first orientation associated with a first soil sample size and different from the second orientation associated with the second sample size with soil sampler 10 in the third state, which third state can also be referred to as an eject state.

To switch soil sampler 10 from the first collection state (FIGS. 3A-4B) or the second collection state (FIGS. 7A-8) into the eject state, a user grabs onto plunger 14, such as through slot 30 of base 12, and then the user lifts and pulls plunger 14 in second axial direction AD2 along collection axis CA outwards from base 12 in a direction away from distal end 18 of base 12. The user then rotates plunger 14 on collection axis CA into the third position relative to base. With the plunger 14 disposed in the third position, first plunger wing 42 and second plunger wing 44 are axially aligned with slot 30. The user then displaces plunger 14 in first axial direction AD1 along collection axis CA. Plunger 14 is inserted into base 12 until first plunger wing 42 and second plunger wing 44 are positioned within slot 30 of base 12. Further, plunger 14 is inserted into base 12 until plunger face 46 of plunger 14 is either positioned flush and parallel with distal end 18 of base 12 or plunger face 46 extends outwards beyond distal end 18 of base 12. Plunger face 46 extending to or beyond distal end 18 of base 12 forces a soil sample within collection cavity 58 out from within collection cavity 58 into a vial or other container for chemical analysis.

As shown best in FIG. 9A, with plunger 14 oriented in the third position relative to base 12, such that soil sampler 10 is in the eject state, first plunger wing 42 and second plunger wing 44 are oriented orthogonal to first base wing 22 and second base wing 24. Further, with plunger 14 oriented in the third position relative to base 12, a top surface of each of first plunger wing 42 and second plunger wing 44 is positioned below proximal end 16 of base 12. As such, with plunger 14 oriented in the third position relative to base 12, first plunger wing 42 and second plunger wing 44 are positioned at least partially within slot 30 of base 12. The portion of first plunger wing 42 and second plunger wing 44 positioned within slot 30 can be configured to engage slot 30 or other features of base 12 through an interference fit (a.k.a. a friction fit) to secure plunger 14 to base 12 when plunger 14 is in the third position.

In one example, when plunger 14 is in the third position relative to base 12, plunger face 46 can be positioned flush and parallel with distal end 18 of base 12. In another examples, when plunger 14 is in the third position relative to base 12, plunger face 46 can extend outwards beyond distal end 18 of base 12. As such, in either example, plunger 14 being oriented in the third position results in collection cavity 58 having a third volume which is less than the first volume when the plunger is in the first position, and less than the second volume when the plunger is in the second position. As soil sampler 10 is transitioned to the eject state from either the first or second collection state, plunger face 46 encounters the soil sample within collection cavity 58 and drives the soil in a first axial direction AD1 to force the collected soil sample (either the smaller size or the larger size sample) out of barrel 20 from within collection cavity 58. As such, a user can orient plunger 14 in either the first position or the second position to collect a soil sample of a first size or a second size, respectively. Then the user can transition plunger 14 into the third position and drive plunger 14 axially within base 12 causing plunger face 46 to translate towards distal end 18 of base 12 to expel the collected soil sample from within collection cavity 58. In some examples, distal end 18 of base 12 can be sized to fit within a standard soil sample volatile organic analysis (VOA) vial, allowing the user to put distal end 18 of base 12 into the vial before expelling the collected soil sample from soil sampler 10. Distal end 18 being sized to fit within a standard VOA vial makes it easier to collect and transfer soil samples of any volume from soil sampler 10 and into the vial for chemical analysis and environmental testing.

While soil sampler 10 is described as configured to take soil samples of two discrete volumes, it is understood that not all examples are so limited. For example, soil sampler 10 can be configured to be placed in a third collection state associated with a third volume of soil, a fourth collection state associated with a fourth volume of soil, etc.

Soil sampler 10 is a tool that can be inserted into soil for taking specific volumes of soil for chemical analysis and environmental testing. Soil sampler 10 is configurable such that multiple different sample sizes can be collected using a single tool. In contrast, previous soil sampler tools are configured to collect only a single sample size. In some examples, soil sampler 10 can collect both 5 gram and 10 gram sample sizes using a single soil sampler 10. Soil sampler 10 makes collecting soil samples for chemical analysis and environmental testing easy, convenient, and fast. In some examples, soil sampler 10 can be a single use component that is thrown away after a single use to prevent soil sample contamination. Further, in some examples, soil sampler 10 can be constructed from a biodegradable material that decomposes over time. In one specific examples, soil sampler 10 can be constructed from a polypropylene biodegradable material. Soil sampler 10 includes wings with an ergonomic design and informative and easy to read indicators identifying the sample size, making soil sampler 10 user friendly. Further, soil sampler 10 including interference fits (e.g., between stops 48, 50 and apertures 60 with soil sampler 10 in the first collection state and between stops 48, 50 and apertures 62 with soil sampler 10 in the second collection state) prevents base 12 and plunger 14 from separating during use or transport, preventing loss or damage of components of soil sampler 10.

Discussion of Non-Exclusive Examples

The following are non-exclusive descriptions of possible examples of the present invention(s).

A soil sampler includes a base having a base body, a barrel extending along a collection axis from the base body to a distal end of the base, and a cavity extending into the base body through a proximal end of the base; and a plunger insertable into the base to define a volume of a collection cavity formed within the barrel. The plunger is mountable to the base in a first position corresponding to a first volume of the collection cavity, a second position corresponding to a second volume of the collection cavity different from the first volume, and a third position corresponding to a third volume of the collection cavity different from the second volume.

The soil sampler of the preceding paragraph can optionally include, additionally and/or alternatively, any one or more of the following features, configurations and/or additional components:

The plunger includes an extension configured to extend into the barrel of the base; and a plunger face positioned at an end of the extension, wherein the collection cavity extends axially between the plunger face and the distal end of the barrel.

The base body includes a first base wing extending from the barrel; and a second base wing extending from the barrel and laterally away from the first base wing, and wherein the cavity is positioned between and extends into the first base wing and the second base wing.

Each of the first base wing and the second base wing include an at least partially curved lower surface, the at least partially curved lower surface is oriented axially towards the distal end.

The plunger includes a first plunger wing extending radially from the extension; and a second plunger wing extending radially from the extension and away from the first plunger wing, and wherein the first plunger wing and the second plunger wing are insertable into the cavity to be at least partially disposed within a handle formed by the first base wing and the second base wing.

The first base wing is positioned 180-degrees from the second base wing about the collection axis, and wherein the first plunger wing is positioned 180-degrees from the second plunger wing about a plunger axis.

The first plunger wing is aligned with the first base wing and the second plunger wing is aligned with the second base wing with the plunger disposed in the first position.

The first plunger wing is aligned with the second base wing and the second plunger wing is aligned with the first base wing with the plunger disposed in the second position.

The first plunger wing is misaligned with both of the first base wing and the second base wing with the plunger in the third position.

The base includes at least one base indicator, wherein the plunger includes at least one plunger indicator, and wherein the at least one base indicator and the at least one plunger indicator together identify a volume of the collection cavity.

A first brace of the base is positioned within a portion of the cavity formed within the first base wing, and wherein the first brace extends from a first lateral side of the first base wing towards a second lateral side of the first base wing; and a first stop of the plunger extends from the first plunger wing on a first side of the plunger, and wherein a first receiver of the plunger extends into the first plunger wing on a second side opposite the first side of the plunger.

The first brace is positioned within the first receiver with the plunger oriented in the first position, and wherein the first stop interfaces with the second brace with the plunger oriented in the second position.

A stop of the plunger extends into an opening within a lower surface of the base to secure the plunger to the base.

The stop of the plunger engages the opening of the lower surface in an interference fit to couple and secure the plunger to the base.

The plunger face is disposed a first distance from the distal end of the barrel with the plunger disposed in the first position; the plunger face is disposed a second distance from the distal end of the barrel with the plunger disposed in the second position; and wherein the second distance is greater than the first distance.

The plunger face is disposed one of adjacent to and flush with the distal end of the barrel and axially outwards past the distal end of the barrel with the plunger disposed in the third position.

A volume of the collection cavity is zero with the plunger disposed in the third position.

A soil sampler for collecting sample volumes of soil, the soil sampler includes a base comprising a barrel elongate along a collection axis, a first base wing extending away from the barrel, a second base wing extending away from the barrel, a cavity extending into the first base wing and the second base wing, and a brace positioned within the cavity; and a plunger insertable into the base, the plunger comprising a first plunger wing, a second plunger wing, and an extension extending axially along a plunger axis from the first plunger wing and the second plunger wing. The extension is configured to be at least partially disposed within the barrel with the plunger in each of a first position associated with a first volume of a collection chamber within the barrel and a second position associated with a second volume of a collection chamber within the barrel. The brace interfaces with a lower surface of the plunger with the plunger disposed in each of the first position and the second position A method of using a soil sampler to collect a soil sample includes aligning a plunger relative to a base in one of a first position and a second position, wherein an extension of the plunger extends into the base along a collection axis to define a collection cavity within the base, the extension at least partially disposed within the base with the plunger in both of the first position and the second position, the first position associated with a first volume of the collection cavity, and the second position associated with a second volume of the collection cavity, the second volume different from the first volume; pressing the base into soil to cause a sample of soil to enter into the collection cavity; pulling the plunger in a first axial direction along the collection axis and axially away from the base; rotating the plunger relative to the base to place the plunger in a third position relative to the base; and driving the plunger in a second axial direction opposite the first axial direction and into the base with the plunger disposed in the third position, the extension driving the sample of soil out of the collection cavity.

The method of the preceding paragraph can optionally include, additionally and/or alternatively, any one or more of the following features, configurations and/or additional components:

Aligning the plunger relative to the base in one of the first position and the second position includes pulling the plunger in the first axial direction and axially away from the base with the plunger oriented in the first position relative to the base; rotating the plunger relative to the base to place the plunger in the second position relative to the base; and driving the plunger in the second axial direction and relative to the base with the plunger disposed in the second position relative to the base to engage a stop of the plunger with the base to prevent further movement of the plunger in the second axial direction relative to the base and such that the collection cavity has the second volume.

A soil sampler includes a base having a barrel extending along an axis from a base body; and a plunger having a plunger body and an extension extending axially from the plunger body, the extension configured to extend into the barrel to define a collection cavity within the barrel. The plunger is mountable to the base in a plurality of orientations, the base interfacing with the plunger to limit a distance that the extension can extend into the barrel in each of the plurality of orientations. Each orientation of the plurality of orientations corresponds to a different volume of the collection cavity.

The soil sampler of the preceding paragraph can optionally include, additionally and/or alternatively, any one or more of the following features, configurations and/or additional components:

The plurality of orientations includes a first orientation corresponding with a first collection cavity volume; and a second orientation corresponding with a second collection cavity volume larger than the first collection cavity volume.

The plunger body is recessed within the base body with the plunger mounted in the first orientation; and the plunger body projects axially from the base body with the plunger mounted in the second orientation.

A plunger cavity is formed within the plunger body; and a brace supported by the base body, wherein the brace is at least partially disposed within the plunger cavity with the plunger mounted in the first orientation.

The plunger includes a plunger rib projecting into the plunger cavity from a first lateral side of the plunger, the plunger rib extending partially across a width of the plunger cavity between the first lateral side of the plunger and a second lateral side of the plunger;

The brace engages the plunger rib with the plunger mounted in the second orientation.

Each orientation of the plurality of orientations corresponds with a different rotational position of the plunger on the axis relative to the base.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A soil sampler comprising:
a base having a base body, a barrel extending along a collection axis from the base body to a distal end of the base, and a cavity extending into the base body through a proximal end of the base; and
a plunger insertable into the base to define a volume of a collection cavity formed within the barrel;
wherein the plunger is mountable to the base in a first position corresponding to a first volume of the collection cavity, a second position corresponding to a second volume of the collection cavity larger than the first volume, and a third position corresponding to ejection of a soil sample from the collection cavity;
wherein the base interfaces with the plunger to limit a distance that an extension of the plunger extends into the barrel to set the volume of the collection cavity with the plunger in each of the first position, the second position, and the third position;
wherein the plunger is configured to rotate relative to the base between the first position, the second position, and the third position; and
wherein the plunger is configured to shift axially along the collection axis such that the extension slides within barrel both before and after rotation of the plunger relative to the base to reposition the plunger between the first position, the second position, and the third position.

2. The soil sampler of claim 1, wherein the plunger comprises:
a plunger face positioned at an end of the extension, wherein the collection cavity extends axially between the plunger face and the distal end of the barrel.

3. The soil sampler of claim 2, wherein the base body further comprises:
a first base wing extending from the barrel; and
a second base wing extending from the barrel and laterally away from the first base wing, and wherein the cavity is positioned between and extends into the first base wing and the second base wing.

4. The soil sampler of claim 3, wherein each of the first base wing and the second base wing include an at least partially curved lower surface, the at least partially curved lower surface is oriented axially towards the distal end.

5. The soil sampler of claim 3, wherein the plunger further comprises:
a first plunger wing extending radially from the extension; and
a second plunger wing extending radially from the extension and away from the first plunger wing, and wherein the first plunger wing and the second plunger wing are insertable into the cavity to be at least partially disposed within a handle formed by the first base wing and the second base wing.

6. The soil sampler of claim 5, wherein the first base wing is positioned 180-degrees from the second base wing about the collection axis, and wherein the first plunger wing is positioned 180-degrees from the second plunger wing about a plunger axis.

7. The soil sampler of claim 5, wherein the base includes at least one base indicator, wherein the plunger includes at least one plunger indicator, and wherein the at least one base indicator and the at least one plunger indicator together identify a volume of the collection cavity.

8. The soil sampler of claim 5, wherein:
a first brace of the base is positioned within a portion of the cavity formed within the first base wing, and wherein the first brace extends from a first lateral side of the first base wing towards a second lateral side of the first base wing; and
a first stop of the plunger extends from the first plunger wing on a first side of the plunger, and wherein a first receiver of the plunger extends into the first plunger wing on a second side opposite the first side of the plunger.

9. The soil sampler of claim 1, wherein a stop of the plunger extends into an opening within a lower surface of the base to secure the plunger to the base.

10. The soil sampler of claim 9, wherein the stop of the plunger engages the opening of the lower surface in an interference fit to couple and secure the plunger to the base.

11. A soil sampler comprising:
a base having a base body, a barrel extending along a collection axis from the base body to a distal end of the base, and a cavity extending into the base body, the base body including a first base wing extending from the barrel and a second base wing extending from the barrel and laterally away from the first base wing, and wherein the cavity is positioned between and extends into the first base wing and the second base wing through a proximal end of the base; and
a plunger insertable into the base to define a volume of a collection cavity formed within the barrel, the plunger including:
an extension configured to extend into the barrel of the base;
a plunger face positioned at an end of the extension, wherein the collection cavity extends axially between the plunger face and the distal end of the barrel;
a first plunger wing extending radially from the extension; and
a second plunger wing extending radially from the extension and away from the first plunger wing, and wherein the first plunger wing and the second plunger wing are insertable into the cavity to be at least partially disposed within a handle formed by the first base wing and the second base wing;
wherein the plunger is mountable to the base in a first position corresponding to a first volume of the collection cavity, a second position corresponding to a second volume of the collection cavity different from the first volume, and a third position corresponding to a third volume of the collection cavity different from the second volume;
wherein the first plunger wing is aligned with the first base wing and the second plunger wing is aligned with the second base wing with the plunger disposed in the first position;
wherein the first plunger wing is aligned with the second base wing and the second plunger wing is aligned with the first base wing with the plunger disposed in the second position; and
wherein the first plunger wing is misaligned with both of the first base wing and the second base wing with the plunger in the third position.

12. A soil sampler comprising:
a base having a barrel extending along an axis from a base body;
a plunger having a plunger body and an extension extending axially from the plunger body, the extension configured to extend into the barrel to define a collection cavity within the barrel, wherein the plunger is configured to shift axially along the axis and relative to the base such that the plunger expels a soil sample from the collection cavity;

wherein the plunger is reorientable relative to the base by the plunger rotating relative to the base on the axis and between a plurality of orientations, the base interfacing with the plunger to limit a distance that the extension can extend into the barrel with the plunger in each orientation of the plurality of orientations;

wherein with the plunger in a first orientation of the plurality of orientations, the extension is axially displaceable within the barrel a first distance towards a distal end of the barrel and the base interfaces with the plunger body to limit axial movement of the extension such that with the collection cavity has a first volume;

wherein with the plunger in a second orientation of the plurality of orientations, the extension is axially displaceable within the barrel a second distance towards the distal end of the barrel and the base interfaces with the plunger body to limit axial movement of the extension such that the collection cavity has a second volume different from the first volume;

wherein a plunger face of the extension is axial spaced away from the distal end of the barrel through which the soil sample enters into the barrel with the plunger mounted to the base in both the first orientation and the second orientation;

wherein with the plunger in a third orientation of the plurality of orientations, the extension is axially displaceable a third distance towards the distal end of the barrel, the third distance greater than the first distance and the second distance, and the extension configured to push the soil sample out through the distal end with the plunger in the third orientation; and wherein each orientation of the plurality of orientations corresponds to a different volume of the collection cavity.

13. The soil sampler of claim 12, wherein:
the plunger body is recessed within the base body with the plunger mounted in the first orientation; and
the plunger body is at least partially recessed within the base body with the plunger mounted in the second orientation.

14. The soil sampler of claim 2, further comprising:
a plunger cavity formed within the plunger body; and
a brace supported by the base body, wherein the brace is at least partially disposed within the plunger cavity with the plunger mounted in the first orientation.

15. The soil sampler of claim 13, wherein the plunger further comprises:
a plunger rib projecting into the plunger cavity from a first lateral side of the plunger, the plunger rib extending partially across a width of the plunger cavity between the first lateral side of the plunger and a second lateral side of the plunger.

16. The soil sampler of claim 15, wherein the brace engages the plunger rib with the plunger mounted in the second orientation.

17. The soil sampler of claim 12, wherein each orientation of the plurality of orientations corresponds with a different rotational position of the plunger on the axis relative to the base.

18. A method of using a soil sampler to collect a soil sample, the method comprising:
aligning a plunger relative to a base in one of a first position and a second position, wherein an extension of the plunger extends into the base along a collection axis to define a collection cavity within the base, the extension at least partially disposed within the base, wherein a first plunger wing of the plunger is aligned with a first base wing of the base with the plunger in the first position and a second plunger wing of the plunger is aligned with a second base wing of the base with the plunger in the first position, and wherein the first plunger wing is aligned with the second base wing and the second plunger wing is aligned with the first base wing with the plunger in the second position, and wherein the first position is associated with a first volume of the collection cavity and the second position is associated with a second volume of the collection cavity, the second volume different from the first volume;
pressing the base into soil to cause a sample of soil to enter into the collection cavity;
pulling the plunger in a first axial direction along the collection axis and axially away from the base;
rotating the plunger relative to the base to place the plunger in an ejection position relative to the base such that the first plunger wing and the second plunger wing are misaligned with the first base wing and the second base wing; and
driving the plunger in a second axial direction opposite the first axial direction and into the base with the plunger disposed in the ejection position, the extension driving the sample of soil out of the collection cavity.

19. The method of claim 18, wherein aligning the plunger relative to the base in one of the first position and the second position further comprises:
pulling the plunger in the first axial direction and axially away from the base with the plunger oriented in the first position relative to the base;
rotating the plunger relative to the base to place the plunger in the second position relative to the base;
driving the plunger in the second axial direction and relative to the base with the plunger disposed in the second position relative to the base to engage a stop of the plunger with the base to prevent further movement of the plunger in the second axial direction relative to the base and such that the collection cavity has the second volume.

* * * * *